Feb. 14, 1928.

R. A. BARTHOLOMEW 1,659,232

CHANGE SPEED DEVICE FOR AUTOMOTIVE VEHICLES

Filed Nov. 21, 1921     4 Sheets-Sheet 1

WITNESSES:
Gustav Genzlinger.
John K Falkner

INVENTOR
Raymond A. Bartholomew
BY
Synnestvedt & Lechner
ATTORNEYS

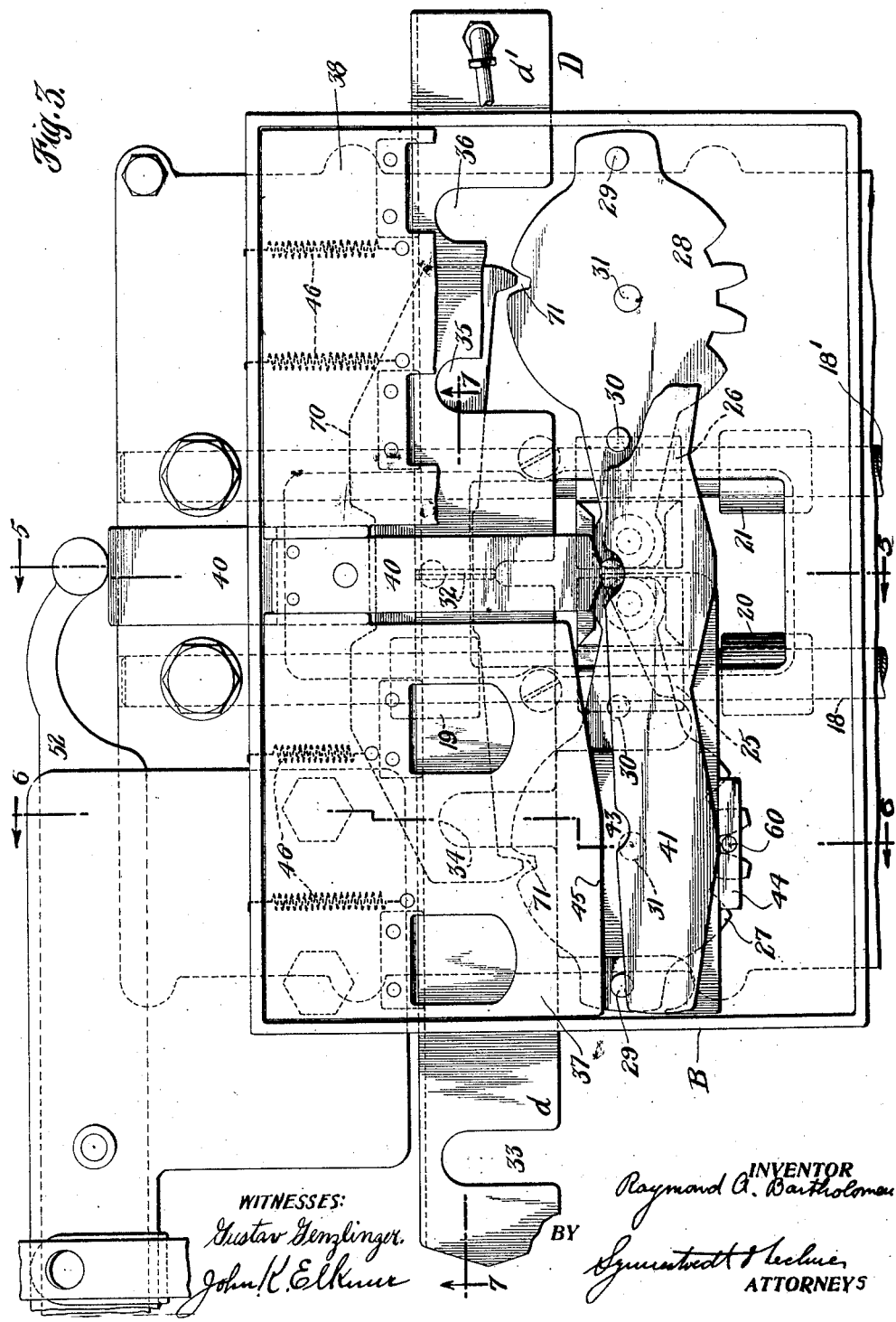

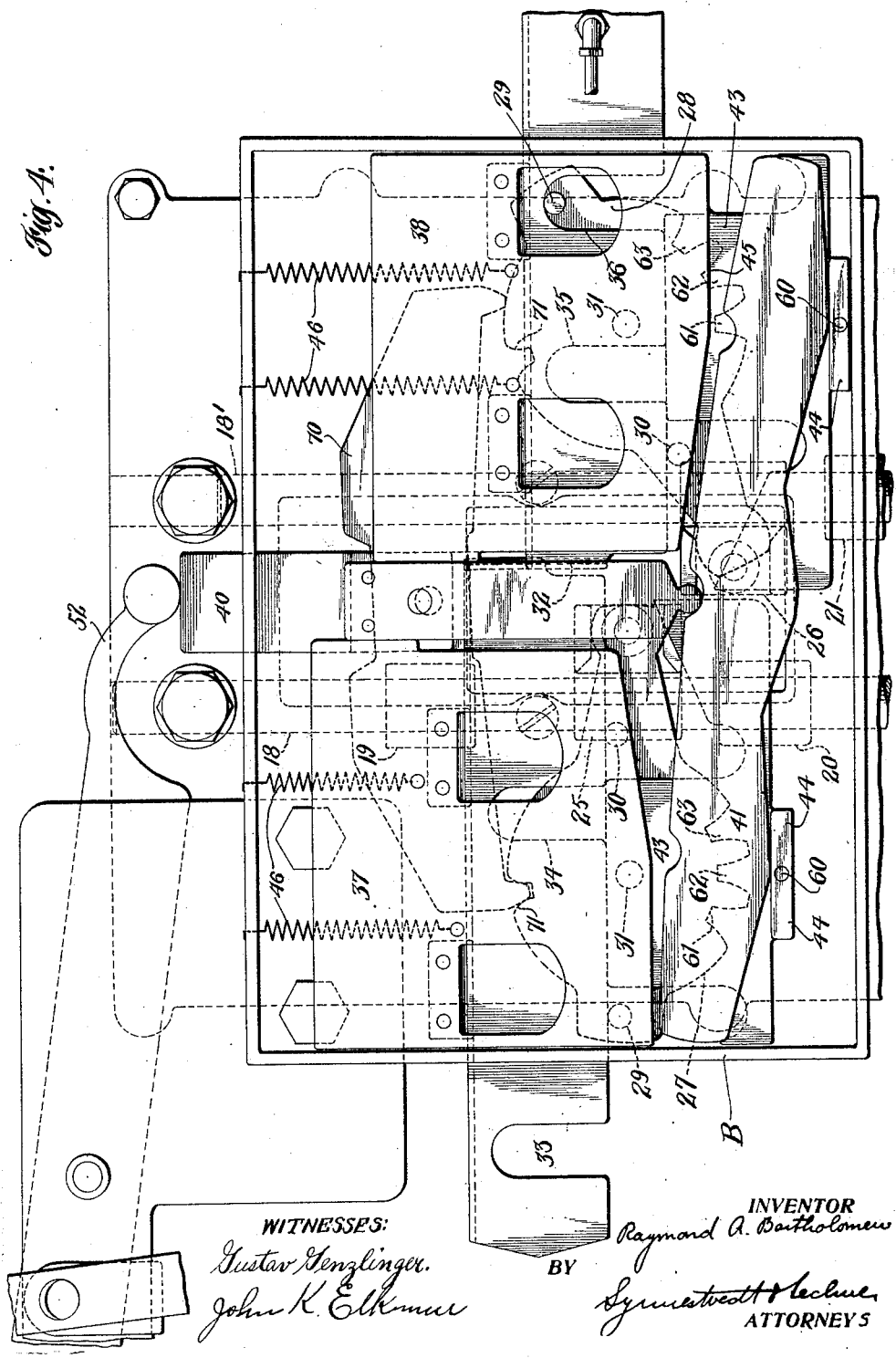

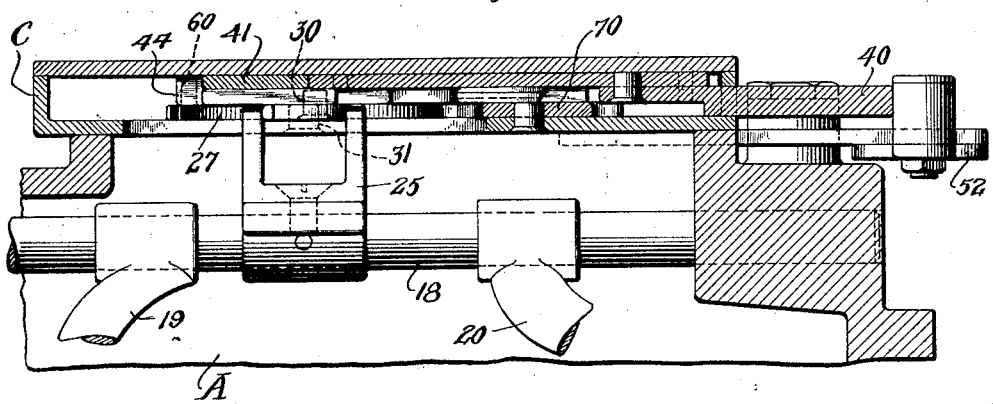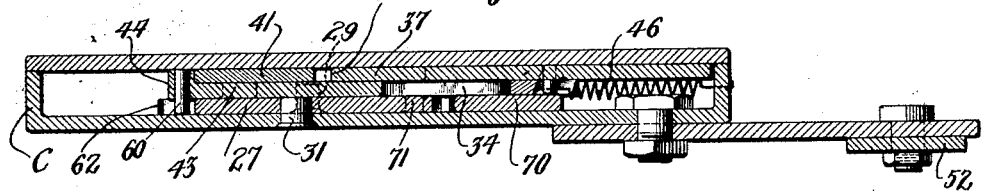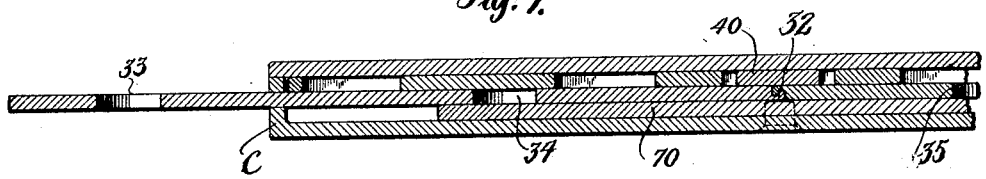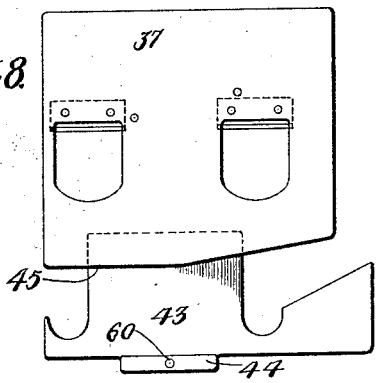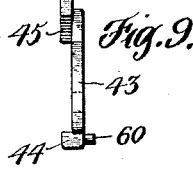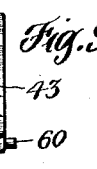

Patented Feb. 14, 1928.

1,659,232

UNITED STATES PATENT OFFICE.

RAYMOND A. BARTHOLOMEW, OF NEW YORK, N. Y.

CHANGE-SPEED DEVICE FOR AUTOMOTIVE VEHICLES.

Application filed November 21, 1921. Serial No. 516,617.

This invention relates to a selective gear shift or change speed device for automobiles and the like in which a selective or permutation actuating mechanism for shifting the gears is set as by hand from the steering wheel column, and then operated,—as by means of the clutch or other pedal—to effect the particular shift for which it is set.

One of the primary objects of my invention is the provision of a simple, compact and effective mechanism of this character which may be readily applied to the gear boxes of cars now in existance, with minimum change in such gear boxes. The importance of this object will be understood when it is considered what little space, in existing cars, is available for this purpose.

Another object of the invention is the provision of mechanism of the character described in which the number of parts is reduced to a minimum and the mechanism otherwise simplified in order to obtain maximum efficiency with minimum cost.

Still another object of the invention is the provision of such an arrangement and construction of parts as will reduce wear to a minimum, thus increasing the life of the mechanism.

My invention further contemplates a device of the character described in which the parts are automatically held in the selected positions, thereby preventing accidental shifting of the gears and the meshing of two sets of gears.

Figure 1:
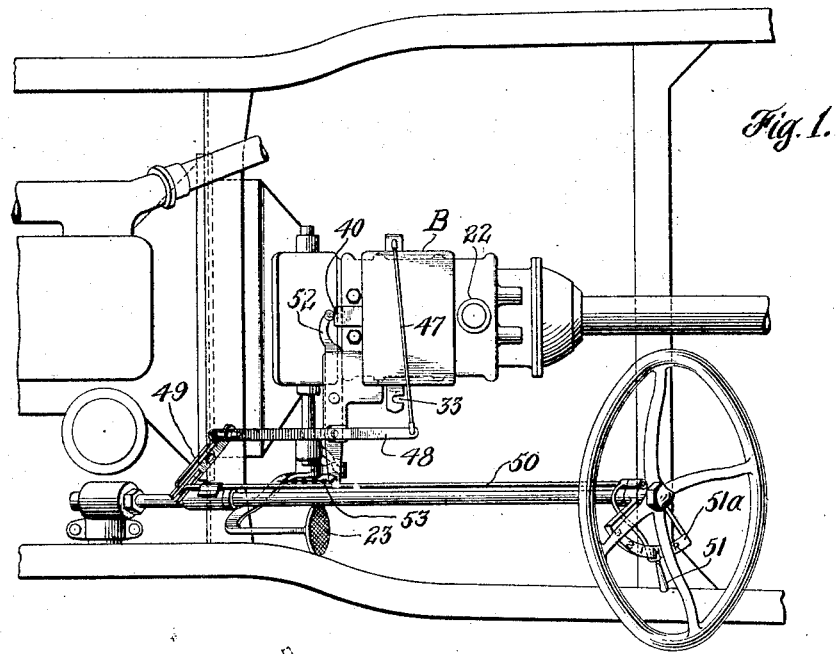
Figure 2:
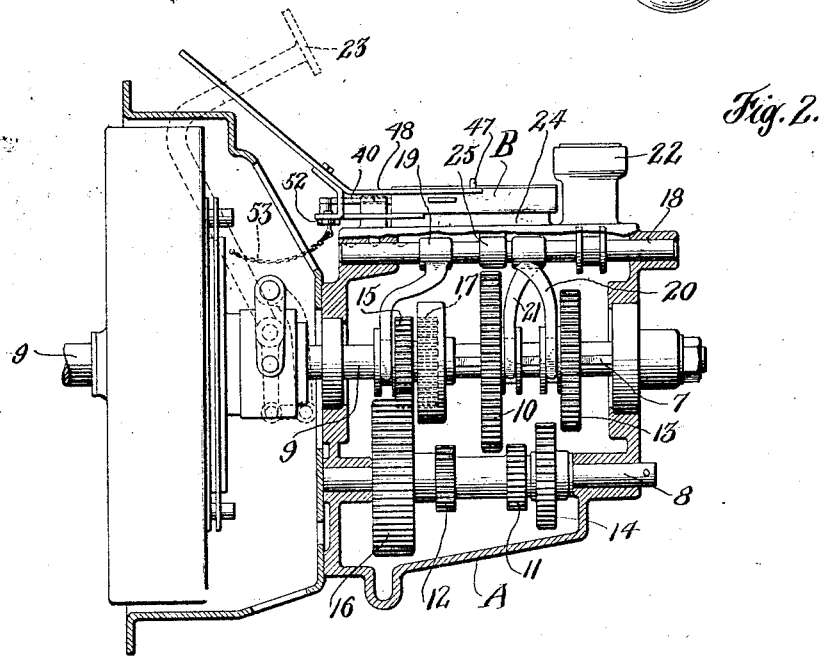

The foregoing, together with such other objects as may hereinafter appear, or are incident to my invention, I obtain by means of a construction which I have illustrated in preferred form in the accompanying drawings wherein:

Fig. 1 is a plan view illustrating the application of my improvements with the gear box of a Dodge car; Fig. 2 is an enlarged view in which the gear box is shown in section and my improvements in side elevation; Fig. 3 is an enlarged plan view of my improvements, the top or cover being removed to expose the working parts, and certain of such parts being broken away for purposes of illustration; Fig. 4 is a view corresponding to Fig. 3 but shows the parts in another position; Fig. 5 is a cross section taken on the line 5—5 of Fig. 3; Figs. 6 and 7 are sectional views taken on the lines 6—6 and 7—7 of Fig. 3; Figs. 8 and 9 are a plan and side elevation, respectively, of a detail of my improvements; and Fig. 10 is a sectional view of another detail.

Referring now to Figs. 1 and 2, it will be seen that the gear box comprises the usual case A in which the transmission shaft 7 and the counter shaft 8 are mounted, the shaft 7 being in alignment with the engine shaft 9. In the position shown in Fig. 2 the gears are in neutral but when the gear 10 is shifted so as to mesh with gear 11, the box is in low gear or first speed; when gear 10 is brought into mesh with the gear (not shown) behind gear 12, the parts are in reverse; when gear 13 is in mesh with gear 14, the parts are in second; and when gear 15 is shifted out of mesh with gear 16 and into mesh with the member 17, the parts are in direct or high speed. As is customary, there are two shift devices or members comprising longitudinally movable bars 18 and 18' (see Figs. 2 and 3), shift bar 18 having two forks 19 and 20, the former being adapted to shift gear 15 and the latter to shift gear 13. The shift bar 18' has one fork 21 for shifting the gear 10. The socket 22 in which the ball hand shift lever is ordinarily mounted is indicated at the right-hand end of Fig. 2, the lever, however, being removed. With the exception of the removal of the lever, the parts are not disturbed so that the lever may be replaced in case the selective operating means should become inoperative.

The usual clutch pedal is indicated in dotted lines at 23 in Fig. 2.

My improvements, indicated as a whole by the reference letter B, in Fig. 2, are substituted for the cover plate which is ordinarily bolted over the lateral opening in the boss-like portion 24 of the case A, adjacent the shift bars 18 and 18', and the only other parts added to the gear box itself are the two fork-like collars 25 and 26, the former being secured to the shift bar 18 and the latter to the shift bar 18'. My selective mechanism is enclosed in the thin, flat casing or housing C, and operates the shift bars 18, 18' through the lateral gear case opening at 24.

Referring now to Figs. 3 to 10, inclusive, the detail construction and operation of the selective or permutation operating means will be described. For shifting the shift bar 18 I provide what I term a flounder-shape lever 27, a similar lever 28 being provided for shifting the bar 18'. The inner ends of these levers fit into the fork portions of the collars 25 and 26 respectively. The levers are pivotally mounted or fulcrumed intermediate their ends in the shallow or flat box-like housing C best seen in Figs. 3, 4 and 5. It will be seen that when the lever 27 is rocked so that its inner end swings forwardly, the shaft bar 18 will be moved forwardly from the neutral position indicated in Fig. 3 and gear 13 will be brought into mesh with gear 14, i. e., the parts will be brought into second speed. When the lever 27 is rocked in the opposite direction, i. e., toward the rear, gear 15 will directly couple with the gear 17 so as to directly connect the engine shaft 9 with the transmission shaft 7 for high speed. Similarly, rearward movement of the lever 28 brings gears 10 and 11 into mesh for low speed, while forward movement shifts the gear 10 into mesh with the gear behind gear 12 for reverse.

It will be noted that each flounder lever is provided with lateral projections formed by pins 29 and 30 arranged on opposite sides of the pivot point 31, and rocking movement is imparted to each flounder lever through the medium of these pins in the following manner:

I provide a selective device or bar indicated as a whole by the reference letter D and comprising two selective actuating devices or members $d$ and $d'$ dovetailed together at their inner ends as indicated at 32 in Fig. 7 so that they may slide relative to each other in a horizontal plane. The member $d$ is provided with two slots 33 and 34 in its edge toward the pins 29 and 30, and similarly the member $d'$ is provided with slots 35 and 36. In the neutral position shown in Fig. 3 none of these slots or recesses come opposite or register with any of the pins 29 and 30 of the two flounder levers.

The members $d$ and $d'$ are mounted to slide crosswise or transversely of the shift bars 18 and 18' in lateral guideways in the plates 37 and 38 respectively, and the plates 37 and 38 are slidably housed in the housing C for longitudinal movement therein in a direction parallel the longitudinal axis of the shift bars. The guide plates 37 and 38 are moved or shifted through the medium of the bar 40, one end of which projects through the housing C and the other end of which is adapted to bear on a floating lever 41, the ends of which loosely engage with the respective plates 37 and 38, as will be clear from inspection of Figs. 3, 8 and 9. An examination of these figures will show that the plates 37 and 38 have extensions 43 and lugs 44, the ends of the floating lever 41 being supported on the extension 43 between the lugs 44 and the shoulders 45. It will be seen that when the bar 40 is shifted to the rear it will carry along with it the floating lever 41, which in turn will shift the plates 37 and 38, as will be further pointed out, from the normal position in which such parts are held by the springs 46, as shown in Fig. 3.

The selective bar D is shifted back and forth to the desired positions by means of the link 47, the pivoted lever 48, the crank arm 49, the shaft 50 and the hand lever 51, as indicated in Fig. 1. The members $d$, $d'$ move in unison, by virtue of their interlocking connection at 32. As will be seen on inspection of this figure, the crank arm 49 is made in two pieces so as to afford adjustment of the apparatus to different cars and for such differences as there may be in cars of the same make.

The bar 40 is operated from the clutch pedal 23 by means of the lever 52 and the chain 53.

Assuming that the parts are in the neutral position shown in Figs. 1 and 3, and that the car is standing, the operation is as follows: The driver shifts the hand lever 51 to the first speed notch on the quadrant 51ª and thereby shifts the selective bar D to the right, to the position indicated in Fig. 4, i. e., to such a position as will bring the slot or aperture 36 opposite to the pin 29 of the lever 28. In this position no apertures will come opposite or register with the remaining three pins on the levers 27 and 28. The driver, when ready, pushes the clutch lever 23 down, releasing the clutch, and (when the lost motion of the chain 53 is taken up) rocking the lever 52 and shoving the bar 40 to the rear. Through the medium of the floating lever 41, such bar 40 carries the plates 37 and 38, and with them the selective bar D, to the rear. The plates 37 and 38 move in unison until such time as the bar $d$ comes into engagement with the non-registering pins 29 and 30 of the lever 27, as indicated in Fig. 4, at which time movement of the plate 37 is arrested. Further movement of the plate 38 is permitted, because of the fact that the pin 29 of the lever 28 is opposite or in register with the slot 36, and the bar $d'$ is free to act on the non-registering pin 30 of the lever 28, rocking such lever to the rear and thereby shifting the shift bar 18' to the rear and causing gear 10 to mesh with gear 11 for first speed. The floating lever 41, it will be seen, fulcrums on the plate 37 associated with the unselected lever 27 and the corresponding bar $d$, and is thus effective to produce this relatively greater independent movement of the plate 38, while the dovetail connection between $d$ and $d'$ permits the latter to shift with respect to the former. The driver now lets the clutch in, i. e., permits the clutch pedal 23 to move rearwardly and the car moves off in first speed.

While the car is in first speed, with the gears in mesh, the driver may set the hand lever 51 for second speed (or for high speed if the conditions are such as will permit him shifting from low into high, or for reverse or for neutral) and the next time the operator tramps on the clutch pedal 23 and releases the clutch, the parts will be shifted so as to make the desired gear shift. Thus, for example, for second speed the slot 34 will come opposite the pin 30 of the lever 27, the remaining pins being engaged by the edge of the members d and d'; for high slot 33 will come opposite pin 29 of lever 27; and for reverse slot 35 will come opposite pin 30 of lever 28. Through the varying cooperation of the selective means 29, 30 and 33, 34, 35, 36, according to the setting of the mechanism, therefore, the gears can be shifted and connected at pleasure as an incident of the operation of the clutch.

When a desired shift has been made in the manner above pointed out and the clutch lever 23 is allowed to swing back and let in the clutch, the springs 46 will carry the plates 37 and 38, the selective bar D, the floating lever 41 and the bar 40 back to the normal position indicated in Fig. 3. During this retrograde movement, the pins 60 on the lugs 44 will enter one of the notches 61, 62 or 63 in the levers 27 and 28. Thus in shifting to first gear, as above described, when the parts return, the pin 60 on the plate 38 will enter the notch 61 in the lever 28 holding such lever in the position to which it has been shifted. The other pin 60 will enter the notch 62 of the lever 27, thus holding such lever in neutral position. By this engagement of the pins 60 with the levers 27 and 28 in the position of the parts normally maintained by the springs 46, therefore, the levers are normally locked, and accidental shifting of the gears is prevented.

In order to prevent accidental and unintended shifting of the gears during that period in the operation of the parts when both pins 60 may be out of locking engagement with the respective levers 27 and 28, I provide a locking lever 70 the ends of which are adapted to engage with the notch 71 in the respective flounder lever. On movement of one lever, the locking lever is kicked into engagement with the notch 71 of the other flounder lever, thus locking it and holding it fast. While lever-actuating movement of the plates 37, 38 releases the levers 27, 28, the unselected lever is securely locked as soon as the selected one is actuated to carry it beyond neutral position either way, and thus establish the corresponding gear connection.

It will be seen from the foregoing that the device is very simple and compact in construction and operates efficiently and expeditiously. It will be apparent that it can be applied to a variety of standard gear boxes or installed as original equipment on new cars. The parts may be readily stamped, since they are practically all in the form of plates. This and the fact that the operating movements of the parts are substantially in the plane of the casing or housing C allows the mechanism and the whole device B to be made of minimum thickness. The superposed parts slide freely and easily over one another, and all the movements are simple, positive, and under perfect control. These features and the fewness and simplicity of the parts minimize friction, wear, breakage, and chances of disarrangement, and also make the manufacture and repair of the device easy and inexpensive.

What I claim is:

1. Change speed mechanism for an automotive vehicle comprising a laterally open gear case, with transmission gearing and shift members for said gearing mounted in said case adjacent its opening; in combination with a thin, flat casing detachably mounted on said gear case over said opening and means therein for selectively operating said shift members including levers movable substantially in the plane of said casing to actuate the shift members, a selective device for determining which lever shall be actuated and means in direct association with the levers operable when one lever is operated to lock the other.

2. In a mechanical gear shift for shifting the gears of a change speed device for automotive vehicles, a pivoted lever, a selector member therefor, and an operating plate for operating the lever through the medium of the selector member, the pivoted lever, the selector member, and the operating plate lying in planes approximating a common plane.

3. Change speed mechanism for an automotive vehicle having transmission gears, comprising lever plates for shifting certain of said gears and slidable actuating plates, said lever and actuating plates having cooperative selective means for determining the gear shift to be made; means for shifting said actuating plates one way for selection and another way to execute the selected lever shift; and means in direct association with said lever plates operable when one lever is operated to lock the other.

4. Change speed mechanism for an automotive vehicle comprising a gear case, with transmission gearing and shift bars for said gearing therein; in combination with a thin, flat operating mechanism in a casing on one side of said gear case, including members movable in a common plane approximating that of said casing to actuate said shift bars, and selective actuating means for said bars having members movable in a like common plane, in unison to make selection but independently to actuate the selected member.

5. A change speed device for automotive vehicles having transmission gears and shift bars, including a lever for actuating each shift bar, a selective device for determining which lever shall be actuated, and an operating means, together with means controlled by said operating means for locking the selected lever in the position to which it is moved.

6. A change speed device for automotive vehicles having transmission gears and shift bars, including a lever for actuating each shift bar, a selective device for determining which lever shall be actuated, and an operating means, together with means controlled by said operating means for locking the selected lever in the position to which it is moved and means for preventing movement of the lever not operated on.

7. A change speed device for automotive vehicles having transmission gears and shift bars, including a lever for actuating each shift bar, a selective device for determining which lever shall be actuated, and an operating means, together with means for engaging and preventing movement of the lever not operated actuated on movement of the other lever.

8. Change speed mechanism for an automotive vehicle having transmission gears and shift bars therefor, comprising members for actuating said shift bars movable in a common plane; and selective operating means for said members comprising an actuating device for each movable in a plane approximating that aforesaid, crosswise of the shift bars to determine the member to be actuated, and lengthwise thereof to actuate the selected member.

9. Change speed mechanism for an automotive vehicle having transmission gears and shift members therefor, comprising levers for actuating said shift members movable in a common plane and actuating plates for said levers, said levers and actuating plates having cooperating selective means for determining which lever shall be actuated and which way rocked; and means for moving said actuating plates in a plane approximating that aforesaid for the purpose of selection, and for imparting to them a different movement in such plane to actuate the lever selected.

10. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; and means for shifting said actuating plates one way over said lever plates for selection and another way to execute the selected lever actuation.

11. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; and means for normally locking said lever plates released by lever-actuating movements of said actuating plates.

12. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; and means for locking the unselected lever upon gear connecting actuation of the selected one.

13. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; means for normally locking said lever plates released by lever-actuating movement of said actuating plates; and means for locking the unselected lever upon gear-connecting actuation of the selected one.

14. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; plates with lateral guideways for said actuating plates slideable with them over said lever plates to actuate the latter; and means for shifting said actuating plates in the guideways for purposes of selection.

15. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; plates with lateral guideways for said actuating plates slideable with them over said lever plates to actuate the latter; means for shifting said actuating plates in the guideways for purposes of selection; and means for imparting lever-actuating movement to said guideway plates including a floating lever adapted to fulcrum on the one of them associated with the unselected lever plate.

16. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; plates with lateral guideways for said actuating plates slideable with them over said lever plates to actuate the latter, and having means for normally engaging and locking said lever plates; means for normally maintaining said guideway plates in lever-locking position; and means for shifting said actuating plates in the guideways for purposes of selection.

17. Change speed mechanism for an automotive vehicle having transmission gears and shift members therefor, comprising lever plates for actuating said shift members and actuating plates slideable on said lever plates, said lever and actuating plates having cooperating selective means for determining the gear shift to be made; means for shifting said actuating plates one way over said lever plates for selection and another way to execute the selected lever actuation; plates with lateral guideways for said actuating plates slideable with them over said lever plates to actuate the latter, and having means for normally engaging and locking said lever plates; means for normally maintaining said guideway plates in lever-locking position; means for locking the unselected lever upon gear-connecting actuation of the selected one; and means for shifting said actuating plates in the guideways for purposes of selection.

18. Change speed mechanism for an automotive vehicle having transmission gears and shift members therefor, comprising levers for actuating said shift members movable in a common plane and having lateral projections at either side of their fulcra; selective actuating plates beside said levers with recesses in their edges toward said projections; means for shifting said plates to bring their recesses into register with different projections; and means for moving the plate with registering recess edgewise against the other projection of the corresponding lever to actuate it.

19. Change speed mechanism for an automotive vehicle having transmission gears and shift members therefor, comprising lever plates for actuating said shift members movable in a common plane and having lateral projections at either side of their fulcra; selective actuating plates movable over said lever plates and having recesses in their edges toward said projections; plates with lateral guideways for said actuating plates movable to shift them edgewise toward said projections; means for moving said actuating plates to bring their recesses into register with different projections; and means for independently moving said guideway plates as aforesaid including a floating lever adapted to fulcrum on whichever has no recess in register with a lever plate projection.

20. Change speed mechanism for an automotive vehicle having transmission gears and shift members therefor, comprising lever plates for actuating said shift members movable in a common plane and having lateral projections at either side of their fulcra; selective actuating plates movable over said lever plates and having recesses in their edges toward said projections; plates with lateral guideways for said actuating plates movable to shift them edgewise toward said projections, and having means for normally engaging and locking said levers; means for moving said actuating plates to bring their recesses into register with different projections; means for normally maintaining the guideway plates in lever-locking position; and means for moving the guide plate whose actuating plate has its recess in register with a lever projection out of locking engagement with the lever, and against the other projection of said lever.

21. Change speed mechanism for an automotive vehicle having transmission gears and shift members therefor, comprising lever plates for actuating said shift members movable in a common plane and having lateral projections at either side of their fulcra; selective actuating plates movable over said lever plates and having recesses in their edges toward said projections; plates with lateral guideways for said actuating plates movable to shift them edgewise toward said projections, and having means for normally engaging and locking said levers; means for moving said actuating plates to bring their recesses into register with different projections; means for normally maintaining the guideway plates in lever-locking position; means for moving the guide plates out of locking engagement with the levers and forcing the actuating plate whose recess is in register with a lever projection against the other projection of the lever to actuate it; and means for holding the other lever fast while thus unlocked.

In testimony whereof, I have hereunto signed my name.

RAYMOND A. BARTHOLOMEW.